United States Patent
Kumakura

(10) Patent No.: US 6,585,614 B1
(45) Date of Patent: Jul. 1, 2003

(54) GUIDE FOR CHAIN DRIVE

(75) Inventor: Atsushi Kumakura, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/628,377

(22) Filed: Jul. 31, 2000

(30) Foreign Application Priority Data

Jul. 30, 1999 (JP) ............................................ 11-217285

(51) Int. Cl.$^7$ .............................. F16H 7/08; F16H 7/18
(52) U.S. Cl. ...................................... 474/111; 474/140
(58) Field of Search .............................. 474/111, 138, 474/140, 110, 101, 109, 147; 248/223.21, 500, 224.8, 224.4; 83/692, 693, 581, 917; 360/291.2; 353/69, 95

(56) References Cited

U.S. PATENT DOCUMENTS

| | | | |
|---|---|---|---|
| 4,534,631 A | * 8/1985 | Hillstrom et al. | ............. 353/69 |
| 4,630,423 A | * 12/1986 | Lind | ................... 248/224.4 X |
| 4,677,511 A | * 6/1987 | Komatsu | ................ 360/291.2 |
| 4,832,664 A | 5/1989 | Groger et al. | |
| 5,074,077 A | * 12/1991 | Toyoshima et al. | ..... 474/117 X |
| 5,183,441 A | * 2/1993 | Urda | ....................... 474/117 X |
| 5,776,024 A | * 7/1998 | White et al. | ............ 474/110 X |
| 5,989,138 A | * 11/1999 | Capucci | .................. 474/111 X |

FOREIGN PATENT DOCUMENTS

| | | | |
|---|---|---|---|
| DE | 3417100 A | | 7/1985 |
| DE | 42 00 951 | | 2/1993 |
| DE | 43 41 019 | | 6/1995 |
| DE | 197 56 489 | | 6/1998 |
| DE | 37 06 136 | | 9/1998 |
| GB | 2320546 | * | 6/1998 |
| GB | 2331259 | * | 5/1999 |
| JP | 6-49150 | | 6/1994 |
| JP | 7-259938 | | 6/1995 |
| JP | 8-219241 | | 6/1996 |
| JP | 09-15538 | * | 1/1997 |
| JP | 10-281244 | | 6/1998 |
| JP | 311395 | * | 11/1998 |
| JP | 257679 | * | 9/2000 |

* cited by examiner

*Primary Examiner*—Marcus Charles
(74) *Attorney, Agent, or Firm*—Dann, Dorfman, Herrell and Skillman; Henry H. Skillman

(57) ABSTRACT

A guide for a chain drive installed on an engine body having threaded holes formed therein with a pitch, wherein the guide has at least two mounting portions adapted to be attached to the engine body by means of screws threaded into the threaded holes in the engine body. At least one of the mounting portions has at least two circular mounting holes spaced in a longitudinal direction of the guide so that the guide can be also mounted to at least one similar engine body having threaded holes formed therein with a different pitch.

2 Claims, 9 Drawing Sheets

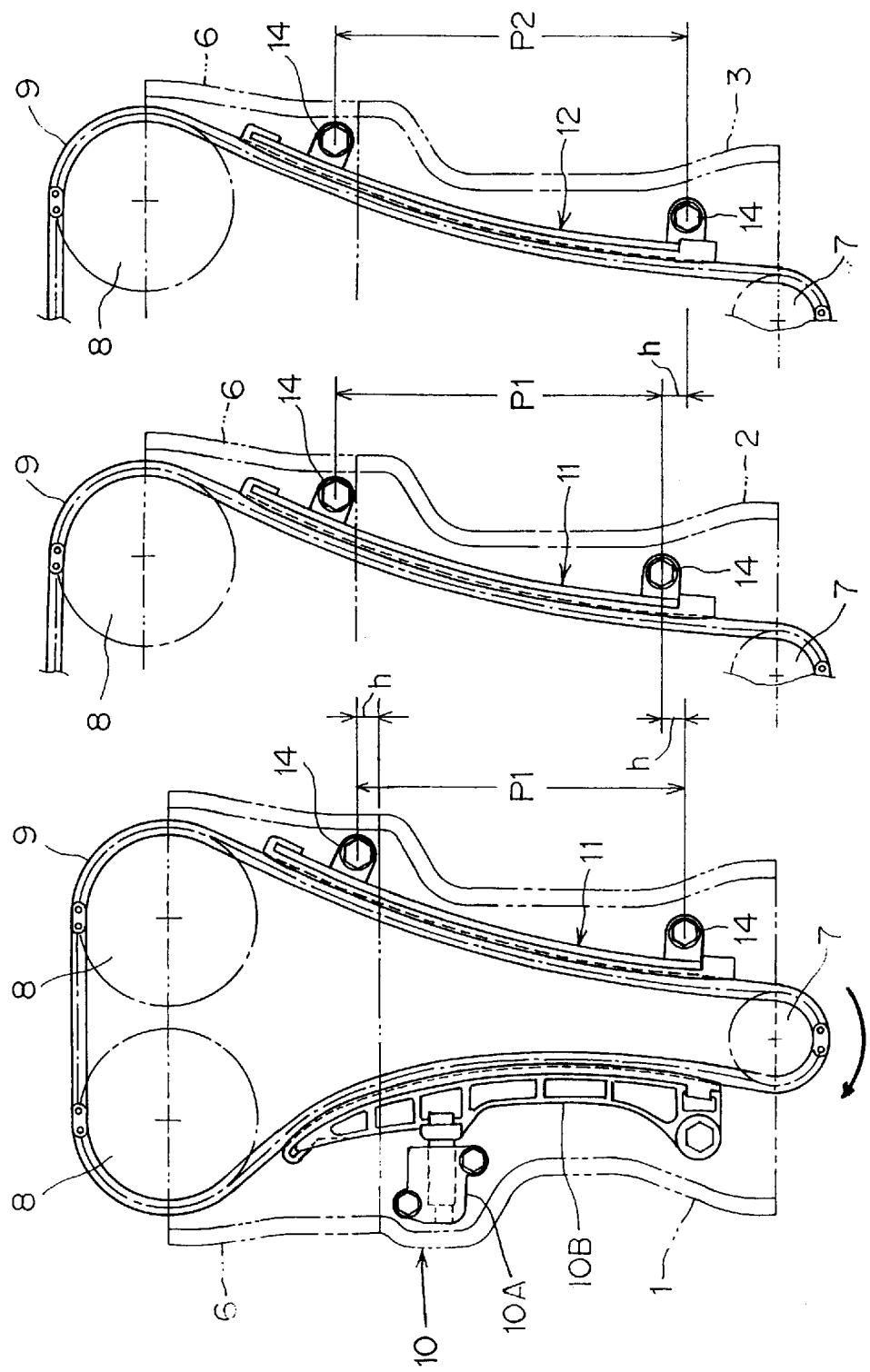

FIG.9A
(Prior Art)
FIG.9B
(Prior Art)
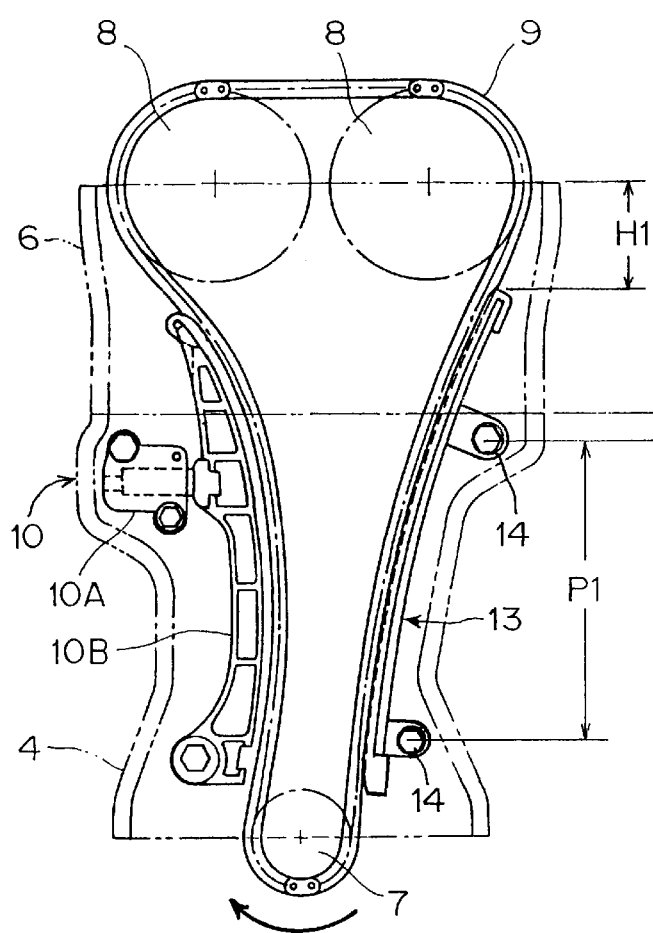
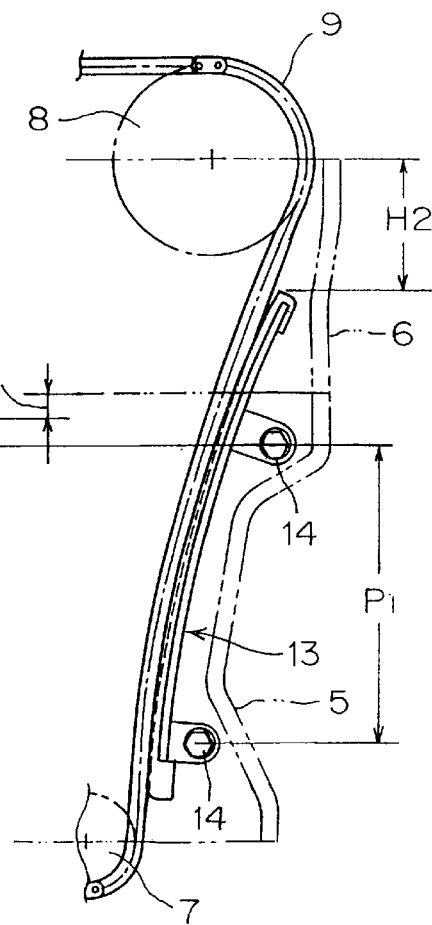

GUIDE FOR CHAIN DRIVE

BACKGROUND OF THE INVENTION

1. Field of the Invention

The present invention relates to a guide for a chain drive provided on an engine body.

2. Description of the Related Art

Conventionally, chain drives installed on an engine body having a cylinder block and a cylinder head are classified into two types according to the way of mounting a guide to the engine body.

A first type of conventional chain drive is shown in FIG. 8A and includes a guide 11 mounted to an engine body so that it extends over a cylinder block 1 and a cylinder head 6 of the engine body. In the chain drive, a chain 9 is trained around a sprocket (crank sprocket) 7 rotatably mounted on the cylinder block 1 and two sprockets (cam sprockets) 8, 8 rotatably mounted on the cylinder head 6, and a tensionder device 10 is disposed on the exterior side of a slack run of the chain 9 for applying an appropriate tension to the chain 9. The guide 11 for the chain drive is disposed on the exterior side of a tension run of the chain 9 for preventing oscillation of the chain 9 while running.

The tensioner device 10 is comprised of a tensioner lever 10B pivotally connected at one end to a mounting surface of the cylinder block 1, and a tensioner 10A for urging a free end portion of the tensioner lever 10B against the chain 9. By a biasing force of the tensioner 10A, a shoe surface of the tensioner lever 10B is forced against the slack run of the chain 9 so that an appropriate tension is applied to the chain 9.

The guide 11 has two mounting portions provided near opposite longitudinal ends of the guide 11 and each formed with one circular mounting hole (not show). A screw 14 is inserted through the mounting hole of one mounting portion (upper mounting portion) and threaded into a threaded hole (not shown) formed in the cylinder head 6. Similarly, a screw 14 is inserted through the mounting hole of the other mounting portion (lower mounting portion) and threaded into a threaded hole (not shown) formed in the cylinder block 1. The guide 11 is thus mounted to the engine body by means of the screws 14.

A second type of conventional chain drive is shown in FIG. 9A and includes a guide 13 mounted to a cylinder block 4 of an engine body. In the chain drive used on the engine body comprised of the cylinder block 4 and a cylinder head 6, a chain 9 is trained around a cylinder block side sprocket (crank sprocket) 7 and two cylinder head side sprockets (cam sprockets) 8, 8, and a tensionder device 10 is disposed on the exterior side of a slack run of the chain 9 for applying an appropriate tension to the chain 9. The guide 13 for the chain drive is disposed on the exterior side of a tension run of the chain 9 for preventing oscillation of the chain 9 while running.

The tensioner device 10 is comprised of a tensioner lever 10B pivotally connected at one end to a mounting surface of the cylinder block 4, and a tensioner 10A for urging a free end portion of the tensioner lever 10B against the chain 9. By a biasing force of the tensioner 10A, a shoe surface of the tensioner lever 10B is forced against the slack run of the chain 9 so that an appropriate tension is applied to the chain 9.

The guide 13 has two mounting portions provided near opposite longitudinal ends of the guide 13 and each formed with one circular mounting hole (not shown). Two screw 14 are inserted through the respective mounting holes of the upper and lower mounting portions and threaded into threaded holes (not shown) formed in the cylinder block 4, whereby the guide 13 is mounted to the cylinder block 4 by means of the screws 14.

In an engine, there is a case where the cubic capacity or displacement of the engine is changed by replacing the cylinder block with another cylinder block having a different height while the cylinder head remains unchanged.

FIG. 8B shows a right half of the chain drive which is used on an engine body whose cubic capacity has been changed by using a cylinder block 2 having a different height than the cylinder block 1 shown in FIG. 8A.

As shown in FIG. 8B, in the case where the cubic capacity of the engine is changed by using a cylinder block 2 of a different height (larger height) in combination with the existing cylinder head 6, in order to use the same guide 11 in common, the distance or pitch P1 between the threaded hole in the cylinder head 6 and a threaded hole in the cylinder block 2 must be made equal to the distance or pitch P1 between the threaded hole in the cylinder head 6 and the threaded hole in the cylinder block 1. To this end, the position of the threaded hole formed in the cylinder block 2 is displaced upward from that of the threaded hole in the cylinder block 1 by a distance h which is equal to a difference in height between the cylinder blocks 2 and 1. There arises a problem that the same working or processing cannot be used for forming threaded holes in more than two cylinder blocks of different sizes (heights).

As shown in FIG. 8C, in the case where the cubic capacity of the engine is changed by using a cylinder block 3 of a different height in combination with the existing cylinder head 6, if the use of the same processing on the cylinder block takes preference over the use of the same guide, a threaded hole in the cylinder block 3 is formed at the same position as the threaded hole in the cylinder block 1 shown in FIG. 8A. Due to a difference in pitch between the threaded hole of the cylinder head and the threaded hole of the cylinder block, the same guide 11 cannot be used. To deal with this problem, a similar guide 12 must be provided, having two circular mounting holes spaced at the same distance or pitch as the pitch P2 between the threaded holes in the cylinder block 3 and cylinder head 6. As a consequence, similar guides of different sizes (lengths) must be provided, tending to cause confusion between them.

FIG. 9B shows a right half of the chain drive which is installed on an engine body whose cubic capacity has been changed by using a cylinder block 5 having a different height than the cylinder block 4 shown in FIG. 9A.

The guide 13 shown in FIG. 9A has two circular mounting holes (not shown) formed in two mounting portions provided near opposite longitudinal ends of the guide 13. Two screw 14 are inserted through the respective mounting holes of the upper and lower mounting portions of the guide 13 and threaded into two threaded holes (not shown) both formed in the cylinder block 4, whereby the guide 13 is attached by the screws 14 to the cylinder block 4. Accordingly, in the case where the cubic capacity of the engine is changed by replacing the cylinder block 4 with a cylinder block 5 of a different height while the cylinder head 6 remains unchanged, as shown in FIG. 9B, the same processing can be used in common such that two threaded holes are formed in the cylinder block 5 at the same position as those formed in the cylinder block shown in FIG. 9A. Thus, the same guide 13 can be used.

However, the chain drive shown in FIG. 9A and the chain drive shown in FIG. 9B differ from each other in the positional relationship between the guide 13 and an adjacent one of the cylinder head side sprockets (cam sprockets) 8. More specifically, the distance H2 (FIG. 9B) between the axis of the cam sprocket 8 and an adjacent end (upper end) of the guide 13 is larger than the distance H1 (FIG. 9A) between the axis of the cam sprocket 8 and the adjacent end of the guide 13. This means that the chain drive shown in FIG. 9A and the chain drive shown in FIG. 9B each have a different chain line or path extending between the cam sprocket 8 and the guide 13. Thus, the guides 13 shown in FIGS. 9A and 9B achieve different oscillation preventing effects with respect to the chain 9, tending to vary the acoustic and vibration characteristics of the chain drives.

SUMMARY OF THE INVENTION

With the foregoing drawbacks of the prior art in view, it is an object of the present invention to provide a guide for a chain drive, which is capable of being mounted to mounting to more than two engine bodies each having threaded holes of a different pitch.

To achieve the foregoing object, there is provided, according to one aspect of the present invention the present invention, a guide for a chain drive installed on an engine body having threaded holes formed therein with a pitch, wherein the guide has at least two mounting portions adapted to be attached to the engine body by means of screws threaded into the threaded holes in the engine body. At least one of the mounting portions has at least two circular mounting holes spaced in a longitudinal direction of the guide so that the guide can be also mounted to at least one similar engine body having threaded holes formed therein with a different pitch.

By properly selecting one mounting hole of the at least two mounting holes, the guide can be mounted to two or more engine bodies each having a different threaded hole pitch. The guide can be commonly used for more than two chain drives of different sizes. This makes it possible to reduce the costs required for the manufacture and inventory of parts of the chain drive and avoid confusion with a similar guide.

In the case where the guide attached to the engine body extends over a cylinder head and a cylinder block, the guide is readily adaptable to a modification in which the threaded hole pitch is caused to change due to the use of a cylinder block having a different height. This makes it unnecessary to change the position of the threaded holes formed in the engine body, so that the same working or processing can be used for forming threaded holes in cylinder blocks of different sizes (heights).

The circular mounting holes formed in the at least one mounting portion may be replaced with a single oblong hole elongated in the longitudinal direction of the guide. In this instance, the screw is set to take an appropriate position selectable within the longitudinal extremities of the oblong hole.

According to a second aspect of the present invention, there is provided a guide for a chain drive installed on an engine body including a cylinder block and a cylinder head wherein the chain drive includes a crank sprocket mounted on the cylinder block, a cam sprocket mounted on the cylinder head, and a chain trained around the sprockets, and the engine body has two threaded holes formed in the cylinder block and cylinder head, respectively, with a pitch. The guide has a first mounting portion adapted to be attached to the cylinder head by means of a first screw threaded into the threaded hole in the cylinder head and a second mounting portion adapted to be attached to the cylinder block by means of a second screw threaded into the threaded hole in the cylinder block. The first mounting portion has a single circular mounting hole for the passage therethrough of the first screw, and the second mounting portion has at least two circular mounting holes spaced in a longitudinal direction of the guide and each provided for the passage therethrough of the second screw, so that the guide can also be mounted, without changing a chain line extending between the cam sprocket and the guide, to at least one similar engine body having threaded holes formed therein with a different pitch due to the use of a cylinder block of a different height. The circular mounting holes formed in the second mounting portion may be changed to a single oblong hole elongated in the longitudinal direction of the guide.

The guide having at least two circular mounting holes or a single oblong hole in the second mounting portion is able to accommodate variations in height of the cylinder block without changing a chain line or path extending between the cam sprocket and the guide. Thus, the same chain oscillation preventing effect can be attained at all times regardless of a modification made to change the height of the cylinder body. The chain drive has the same acoustic and vibration characteristics regardless of the change in height of the cylinder block. It is important to note that since the acoustic and vibration characteristics of a chain drive are greatly influenced by a chain line located at an entrance side of the guide when viewed from the direction of travel of the chain, the aforesaid chain line (extending between the cam sprocket and the guide) should preferably be kept always constant.

According to a third aspect of the present invention, there is provided a guide for a chain drive installed on an engine body including a cylinder block and a cylinder head, wherein the chain drive includes a crank sprocket mounted on the cylinder block, a cam sprocket mounted on the cylinder head, and a chain trained around the sprockets, and the engine body has two threaded holes formed in the cylinder block and cylinder head, respectively, with a pitch. The guide has a first mounting portion adapted to be attached to the cylinder head by means of a first screw threaded into the threaded hole in the cylinder head and a second mounting portion adapted to be attached to the cylinder block by means of a second screw threaded into the threaded hole in the cylinder block. The first mounting portion has at least two circular mounting holes spaced in a longitudinal direction of the guide and each provided for the passage therethrough of the first screw, and the second mounting portion has a single circular mounting hole for the passage therethrough of the second screw, so that the guide can also be mounted, without changing a chain line extending between the crank sprocket and the guide, to at least one similar engine body having threaded holes formed therein at a different pitch due to the use of a cylinder block of a different height. The circular mounting holes formed in the first mounting portion may be replaced with a single oblong hole elongated in a longitudinal direction of the guide for the passage therethrough of the first screw.

The guide having at least two circular mounting holes or a single oblong hole in the first mounting portion is able to accommodate variations in height of the cylinder block without changing a chain line or path extending between the crank sprocket and the guide. Since the same guide can be used in common regardless of a change in height of the cylinder block, this arrangement is particularly advantageous when the length of a guide should be minimized due to a small space available around the crank sprocket for installation of the guide.

BRIEF DESCRIPTION OF THE DRAWINGS

Certain preferred embodiments of the present invention will now be described in detail, by way of example only, with reference to the accompanying drawings, in which:

FIG. 8A is a front elevational view showing a chain drive provided on an engine body with a conventional guide and a tensioner device mounted to the engine body;

FIG. 8B is a view similar to FIG. 8A, but showing the guide mounted to an engine body having a cylinder block of a different height;

FIG. 8C is a view similar to FIG. 8B, but showing another conventional guide mounted to the engine body;

FIG. 9A is a front elevational view showing a chain drive provided on an engine body with still another conventional guide and a tensioner device mounted to the engine body; and FIG. 9B is a view similar to FIG. 9A, but showing the guide mounted to an engine body having a cylinder block of a different height.

DETAILED DESCRIPTION OF THE PREFERRED EMBODIMENTS

The following description is merely exemplary in nature and is in no way intended to limit the invention or its application or uses.

Figure 1:
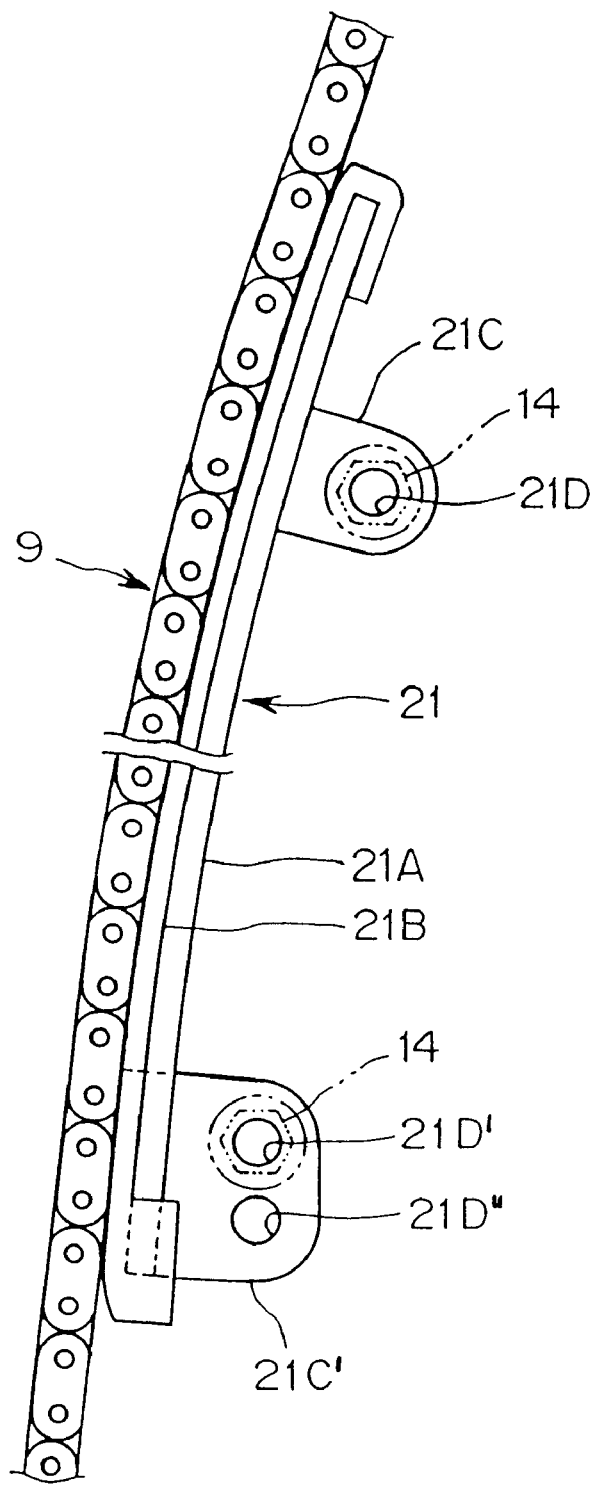
FIG. 1 is a front elevational view showing the positional relationship between a chain of a chain drive and a guide according to a first embodiment of the present invention.

Referring now to the drawings and FIG. 1 in particular, there is shown a guide 21 for a chain drive according to a first embodiment of the present invention. The guide 21 is comprised of an elongated guide body 21A formed from a sheet metal as a strength member, and a shoe 21B formed from a synthetic resin as a slide member. The guide body 21A has mounting portions 21C, 21C' formed at portions near opposite longitudinal ends of the guide body 21A. The mounting portions 21C, 21C' project in a direction opposite to the shoe 21B. One of the mounting portions (lower mounting portion) 21 C' has two circular mounting holes 21D', 21D" spaced a distance from each other in the longitudinal direction of the guide 21. The other mounting portion (upper mounting portion) 21C has a single circular mounting hole 21D. In FIG. 1 numeral 9 denotes a chain of the chain drive.

When the guide 21 is to be mounted to an engine body, one of the two circular mounting holes 21D' and 21D" formed in the lower mounting portion 21C' is selected in view of a pitch between threaded holes (not shown) formed in the engine body, taken with reference to the circular mounting hole 21D formed in the upper mounting portion 21C. Then, two screws 14 indicated by phantom lines in FIG. 1 are inserted into the upper circular mounting hole 21D and selected lower mounting hole 21D' or 21E", respectively, and subsequently threaded Into the threaded holes in the engine body to thereby secure the upper and lower mounting portions 21C, 21C' to corresponding mounting portions of the engine body. The guide 21 of the foregoing construction can be mounted to two engine bodies each having a different pitch between the threaded holes formed in the engine body.

Figure 2:
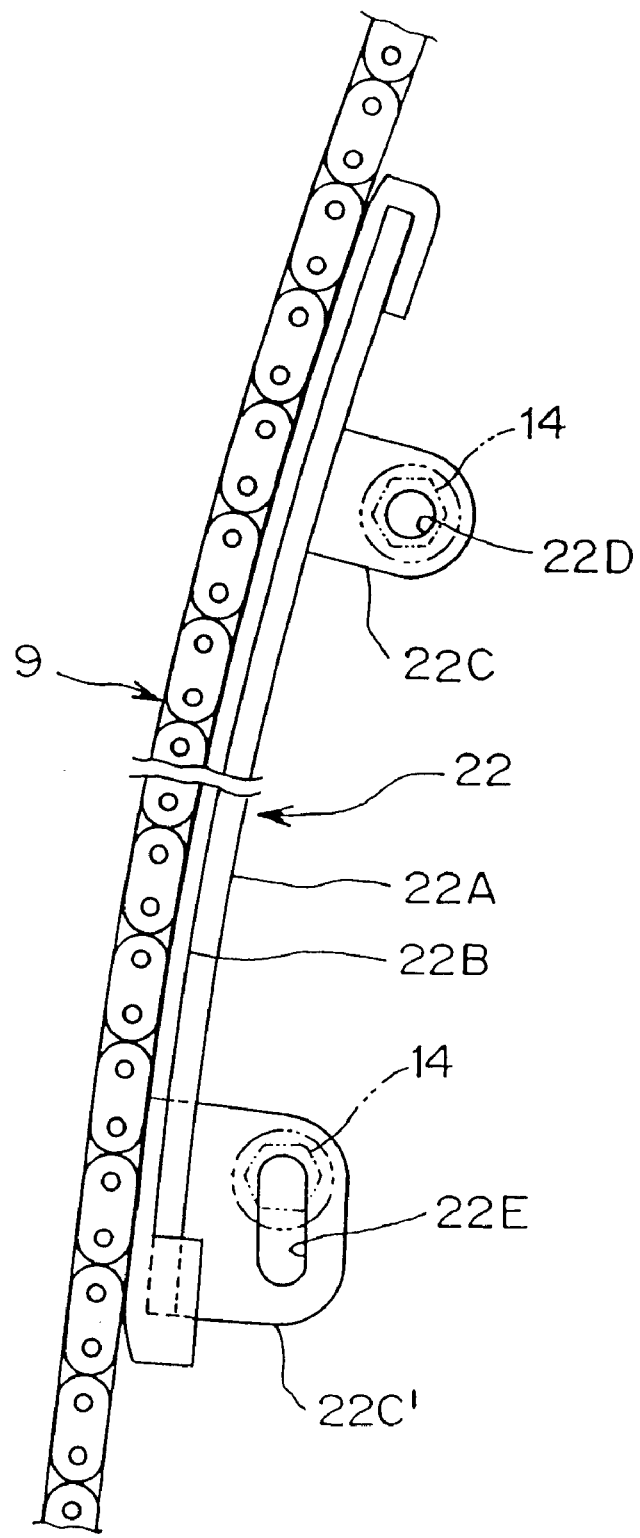
FIG. 2 is a front elevational view showing the positional relationship between a chain of a chain drive and a guide according to a second embodiment of the present invention.

FIG. 2 shows a guide 22 for a chain drive according to a second embodiment of the present invention. The guide 22 is comprised of an elongated guide body 22A formed from a sheet metal as a strength member, and a shoe 22B formed from a synthetic resin as a slide member, as in the same manner as the guide 21 of the first embodiment shown in FIG. 1. The guide body 22A has mounting portions 22C, 22C' formed at portions near opposite longitudinal ends of the guide body 22A. The mounting portions 22C, 22C' project in a direction opposite to the shoe 22B. One of the mounting portions (lower mounting portion) 22C' has a single mounting hole 22E comprised of an oblong hole elongated in the longitudinal direction of the guide 22. The other mounting portion (upper mounting portion) 22C has a single circular mounting hole 22D. In FIG. 2 numeral 9 denotes a chain of the chain drive. The oblong hole 22E has an effective length at least equal to the difference in pitch or distance between a pair of threaded holes formed in one engine body and a pair of threaded holes formed in another engine body.

When the guide 22 is to be mounted to an engine body, one of opposite longitudinal end portions of the oblong hole 22E formed in the lower mounting portion 22C' is selected in view of a pitch between threaded holes (not shown) formed in the engine body, taken with reference to the mounting hole 22D formed in the upper mounting portion 22C. Then, two screws 14 indicated by phantom lines in FIG. 2 are inserted into the upper circular mounting hole 22D and selected portion of the oblong hole 22E, respectively, and subsequently threaded into the threaded holes in the engine body to thereby secure the upper and lower mounting portions 22C,22C' to corresponding mounting portions of the engine body. Within the scope of the oblong hole 22E, the guide 22 of the foregoing construction can be mounted to two or more engine bodies each having a different pitch between the threaded holes formed in the engine body.

Figure 3:
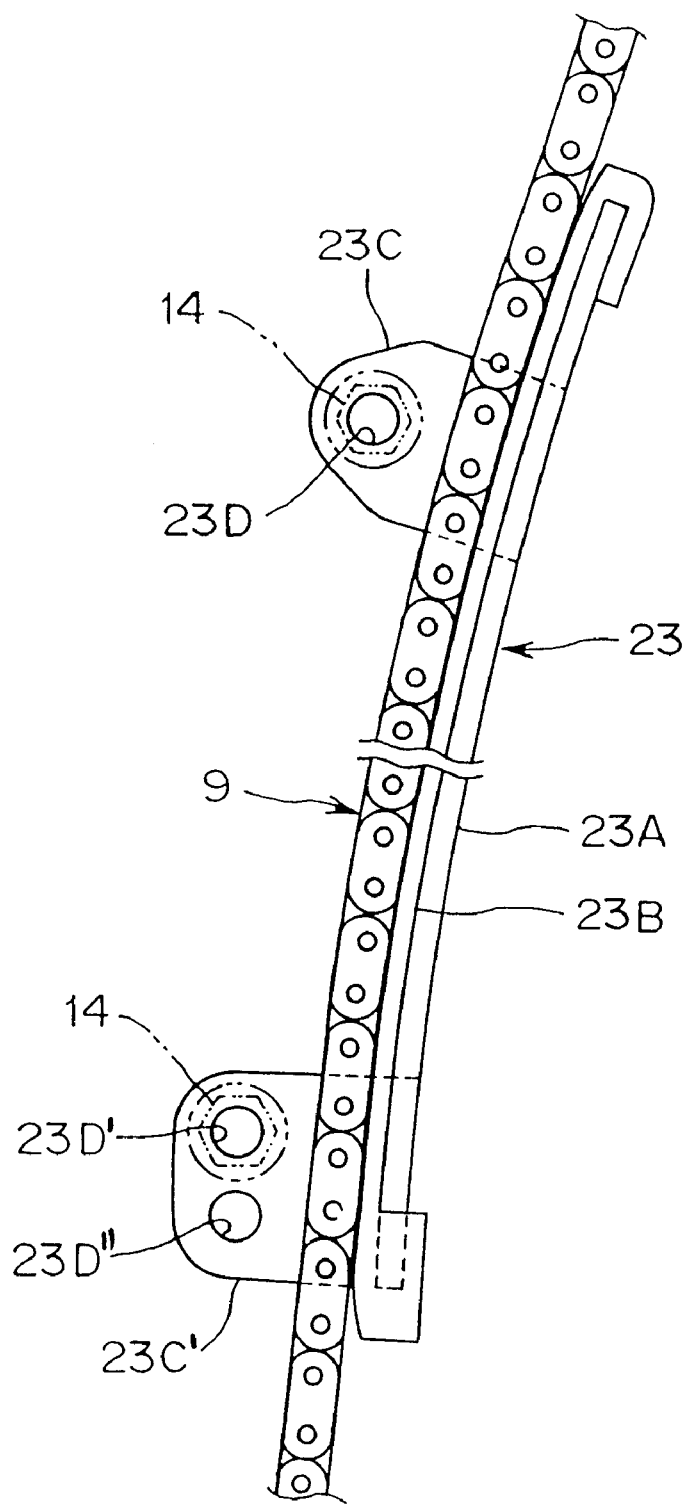
FIG. 3 is a front elevational view showing the positional relationship between a chain of a chain drive and a guide according to a third embodiment of the present invention.

FIG. 3 shows a guide 23 for a chain drive according to a third embodiment of the present invention. The guide 23 is comprised of an elongated guide body 23A formed from a sheet metal as a strength member, and a shoe 23B formed from a synthetic resin as a slide member. The guide body 23A has mounting portions 23C, 23C formed at portions near opposite longitudinal ends of the guide body 23A. The mounting portions 23C, 23C' project in the same direction as the shoe 23B beyond a shoe surface of the shoe 21B. One of the mounting portions (lower mounting portion) 23C' has two circular mounting holes 23D', 23D" spaced a distance from each other in the longitudinal direction of the guide 23. The other mounting portion (upper mounting portion) 23C has a single circular mounting hole 23D. In FIG. 3 numeral 9 denotes a chain of the chain drive.

The guide 23 of the foregoing construction is mounted to an engine body in the same manner as the guide 21 of the first embodiment described previously, and further explanation thereof can, therefore, be omitted.

Figure 4:
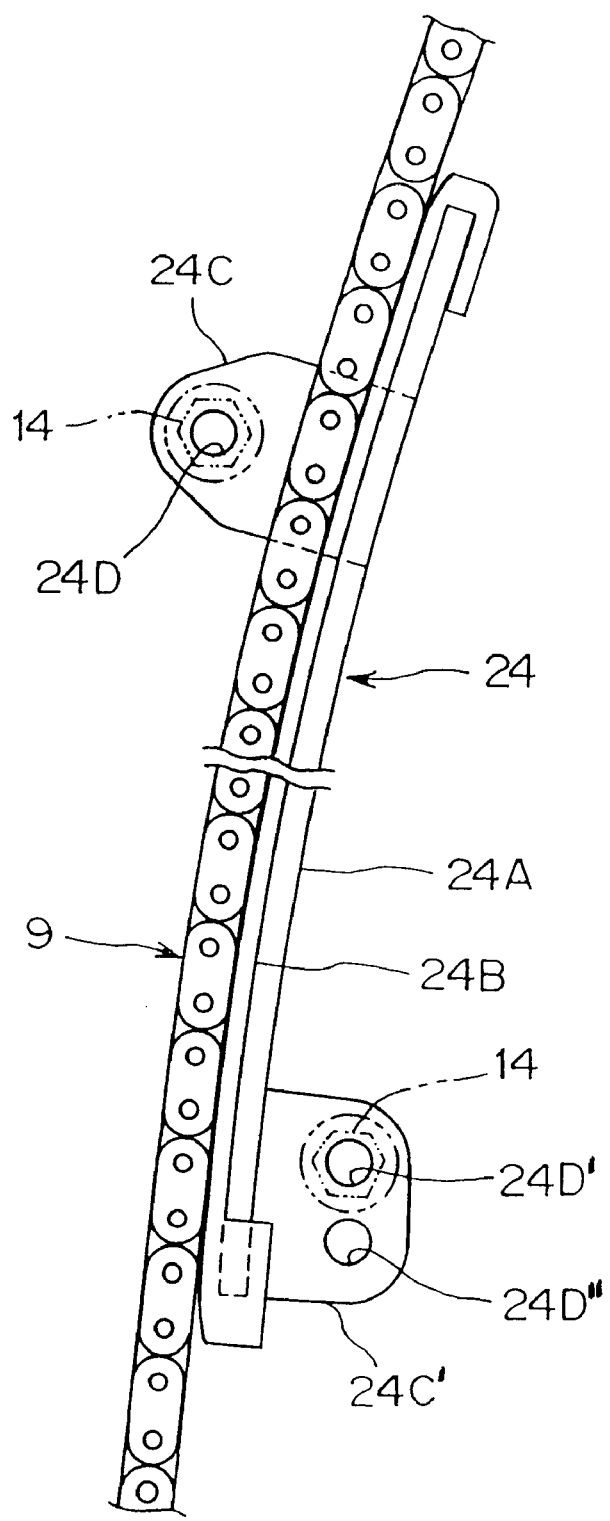
FIG. 4 is a front elevational view showing the positional relationship between a chain of a chain drive and a guide according to a fourth embodiment of the present invention.

FIG. 4 shows a guide 24 for a chain drive according to a fourth embodiment of the present invention. The guide 24 is comprised of an elongated guide body 24A formed from a sheet metal as a strength member, and a shoe 24B formed from a synthetic resin as a slide member. The guide body 24A has mounting portions 24C, 24C' formed at portions near opposite longitudinal ends of the guide body 24A. One of the mounting portions (lower mounting portion) 24C projects in a direction opposite to the shoe 24B, and the other mounting portion (upper mounting portion) 24C projects in the same direction as the shoe surface beyond a shoe surface of the shoe 24B. The lower mounting portion 24C' has two circular mounting holes 24D', 24D" spaced a distance from each other in the longitudinal direction of the guide 24. The upper mounting portion 24C has a single circular mounting hole 24D. In FIG. 4 numeral 9 denotes a chain of the chain drive.

The guide 24 of the foregoing construction is mounted to an engine body in the same manner as the guide 21 of the first embodiment described previously, and no further explanation thereof is needed.

Figure 5:
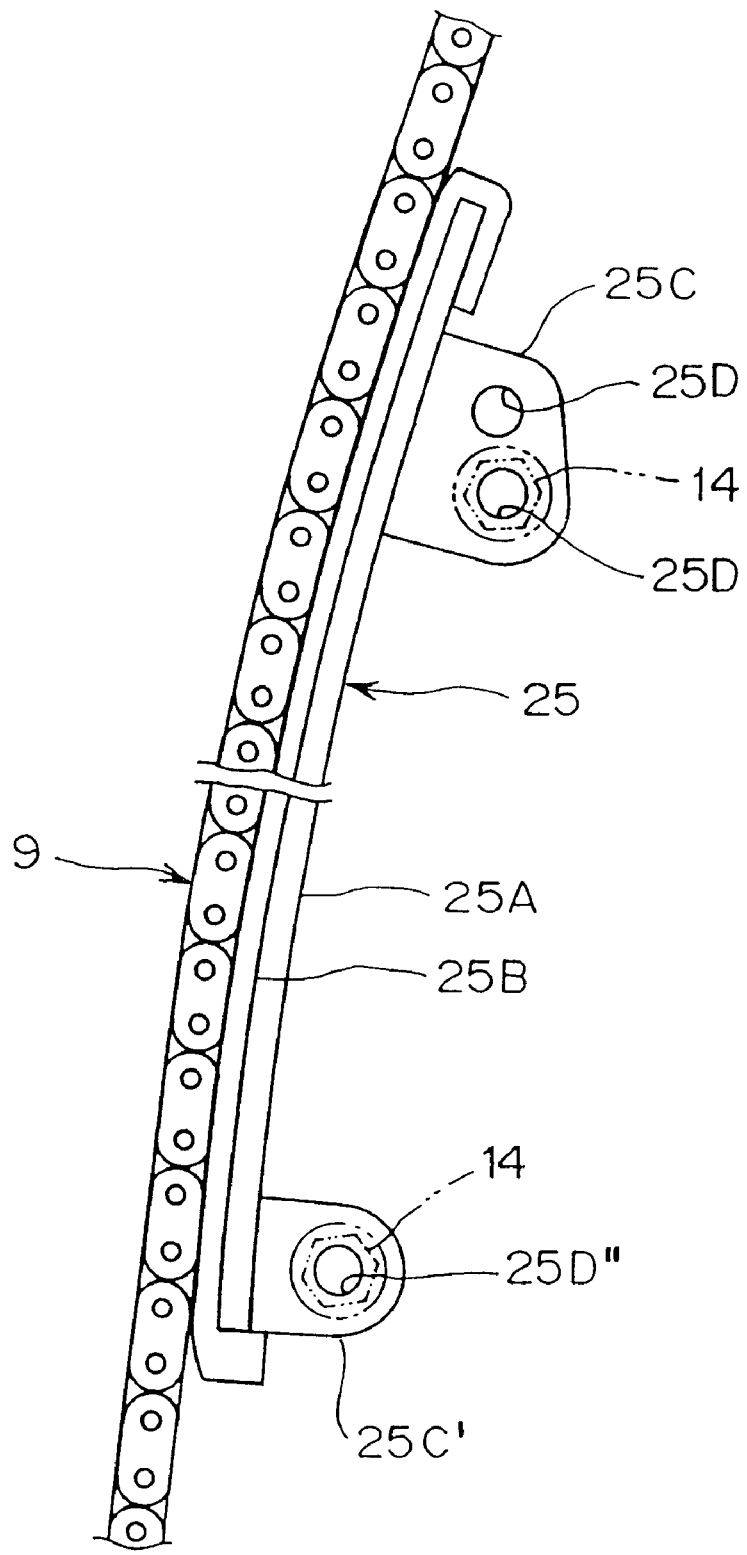
FIG. 5 is a front elevational view showing the positional relationship between a chain of a chain drive and a guide according to a fifth embodiment of the present invention.

FIG. 5 shows a guide 25 for a chain drive according to a fifth embodiment of the present invention. The guide 25 is comprised of an elongated guide body 25A formed from a sheet metal as a strength member, and a shoe 25B formed from a synthetic resin as a slide member. The guide body 25A has mounting portions 25C, 25C' formed at portions near opposite longitudinal ends of the guide body 25A. The mounting portions 25C, 25C' project in a direction opposite to the shoe 25B. One of the mounting portions (upper mounting portion) 25C has two circular mounting holes 25D, 25D' spaced a distance from each other in the longitudinal direction of the guide 25. The other mounting portion (lower mounting portion) 25C" has a single circular mounting hole 21D". In FIG. 5 numeral 9 denotes a chain of the chain drive.

When the guide 25 is to be mounted to an engine body, one of the two circular mounting holes 25D and 25D' formed in the upper mounting portion 25C is selected in view of a pitch between threaded holes (not shown) formed in the engine body, taken with reference to the mounting hole 25D" formed in the lower mounting portion 25C. Then, two screws 14 indicated by phantom lines in FIG. 5 are inserted into the selected upper mounting hole 25D or 25D' and lower mounting hole 25D", respectively, and subsequently threaded into the threaded holes in the engine body to thereby secure the upper and lower mounting portions 25C, 25C' to corresponding mounting portions of the engine body. The guide 25 of the foregoing construction can be mounted to two engine bodies each having a different pitch between the threaded holes formed in the engine body.

Figure 6A:
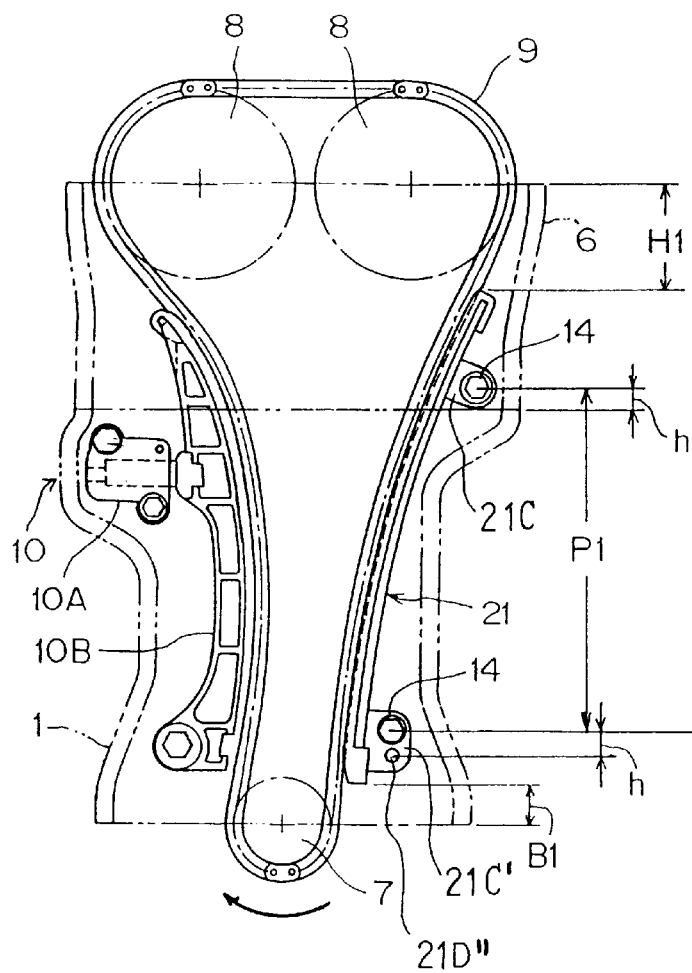
FIG. 6A is a front elevational view showing a chain drive provided on an engine body with the guide shown in FIG. 1 and a tensioner device mounted to the engine body.
Figure 6B:
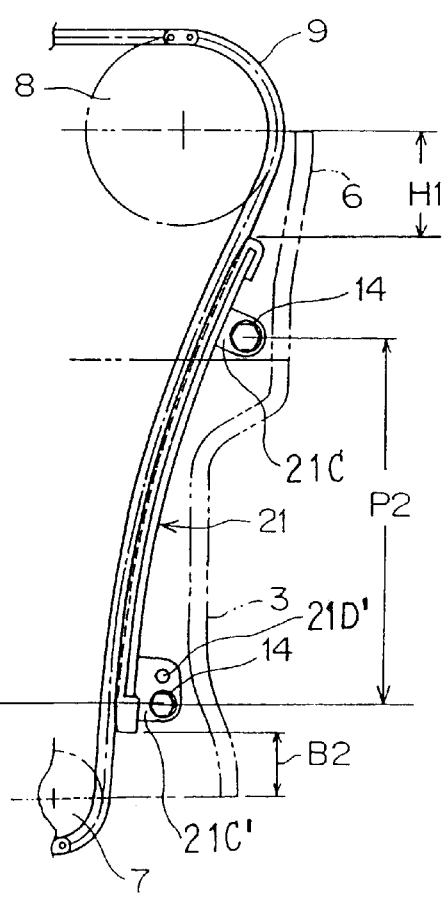
FIG. 6B is a view similar to FIG. 6A, but showing the guide mounted to an engine body having a cylinder block of a different height.

Reference is made to FIG. 6A which shows an engine body equipped with a chain drive including the guide 21 of the first embodiment shown in FIG. 1. The engine body is composed of a cylinder body 1 and a cylinder head 6, and the guide 21 extends over the cylinder block 1 and cylinder head 6 and is mounted to the engine body. The chain drive also includes a tensioner device 10 comprised of a tensioner 10A and a tensioner lever 10B urged by the tensioner 10A against a slack run of a chain 9 of the chain drive. FIG. 6B shows a right half of a chain drive installed on an engine body having a cylinder block 3 which differs in height from the cylinder block 1 shown in FIG. 6A.

The chain drives shown in FIGS. 6A and 6B are substantially the same as those shown in FIGS. 8A and 8C, respectively, except the way of mounting of the guide 21 onto the engine body, as will be understood from the following description.

In the chain drive shown in FIG. 6A, the guide 21 is mounted to the engine body in such a manner that the upper mounting portion 21C is attached to the cylinder head 6 by means of a screw 14 threaded through the mounting hole 21D (see FIG. 1) in the upper mounting portion 21C into a threaded hole (not shown) formed in the cylinder head 6, and the lower mounting portion 21C' is attached to the cylinder body 1 by means of a screw 14 threaded through the upper mounting hole of the two circular mounting holes 21D' and 21D" (lower one being shown) in the lower mounting portion 21C into a threaded hole (not shown) formed in the cylinder block 1. The threaded holes of the engine body are spaced by a distance or pitch P1.

FIG. 6B shows a right half of a chain drive installed on an engine body so modified as to change a cubic capacity or displacement of the engine by replacing the cylinder block 1 of FIG. 6A with a cylinder block 3 having a different height which is larger than the height of the cylinder block 1 by a distance of h.

As shown in FIG. 6B, the cylinder head 6 is the same as the one used in the engine body shown in FIG. 6A. When viewed from the axis of the crank sprocket 7, the threaded hole formed in the cylinder block 3 is located at the same position as the threaded hole formed in the cylinder block 1 shown in FIG. 6A so that the same processing can be used for forming threaded holes of the two different cylinder blocks 1, 3. The guide 21 is mounted to the engine body such that the upper mounting portion. 21C is attached to the cylinder head 6 by means of a screw 14 threaded through the mounting hole 21D (see FIG. 1) into the threaded hole in the cylinder head 6, and the lower mounting portion 21C' is attached to the cylinder block 3 by means of a screw 14 threaded through the lower mounting hole of the two circular mounting holes 21D' and 21D" (upper one 21D' being shown) in the lower mounting portion 21C' into the threaded hole formed in the cylinder block 3. The threaded holes in the engine body is spaced by a distance or pitch P2 which is larger than the pitch P1 (FIG. 6A) by the distance h. By thus using the two circular mounting holes 21D' or 21D" of the lower mounting portion 21C', selectively, the guide 21 can adapt itself to two engine bodies each having a different pitch between the threaded holes formed in the engine body for mounting the guide.

As seen from FIGS. 6A and 6B, modification made to form the engine body of FIG. 6B from the engine body of FIG. 6A does not change the positional relationship between the cam sprockets 8 and the guide 21. In other words, the distance H1 between a horizontal plane containing the axes of the cam sprockets 8 and an end (upper end) of the guide 21 adjacent to the cylinder head 6 of the engine body shown in FIG. 6A is equal to the distance Hi between a horizontal plane containing the axes of the cam sprockets 8 (one being shown) and the upper end of the guide 21 adjacent to the cylinder head 6 of the engine body shown in FIG. 6B. This means that the chain drive shown in FIG. 6A and the chain drive shown in FIG. 6B have the same chain line or path extending between the cam sprockets 8 and the guide 21 with the result that the same chain oscillation preventing effect can be attained in both chain drives shown in FIGS. 6A and 6B. The chain drives shown in FIGS. 6A and 6B have the same acoustic and vibration characteristics regardless of the change in height of the cylinder block. It is important to note that since the acoustic and vibration characteristics of a chain drive are greatly influenced by a chain line located at an entrance side of the guide 21 when viewed from the direction of travel of the chain 9, the aforesaid chain line (extending between the cam sprocket 8 and the guide 21) should preferably be kept constant.

Figure 7A:
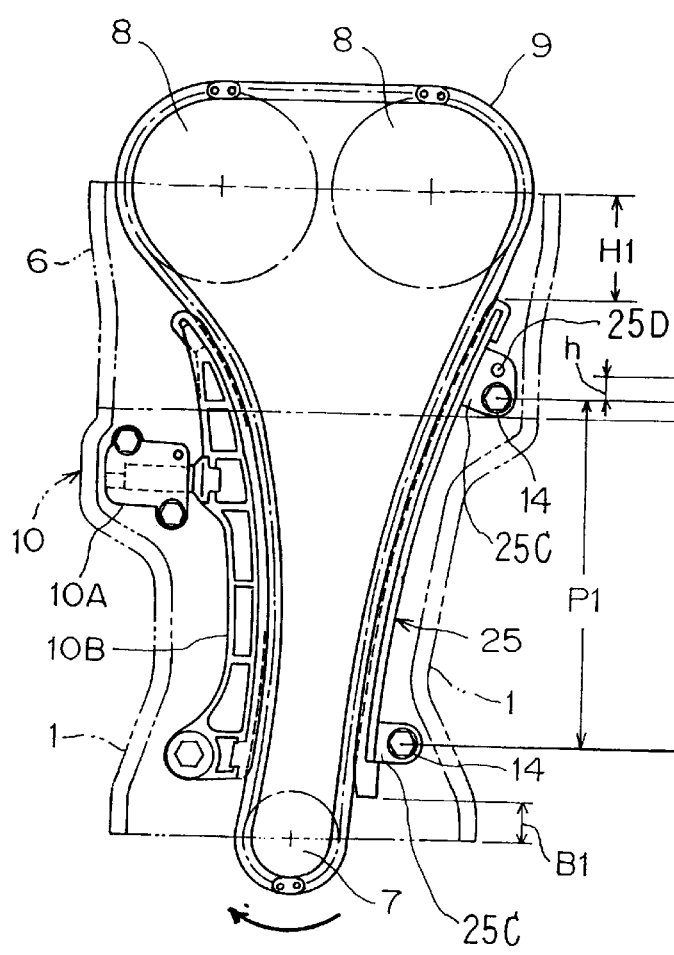
FIG. 7A is a front elevational view showing a chain drive provided on an engine body with the guide shown in FIG. 5 and a tensioner device mounted to the engine body.
Figure 7B:
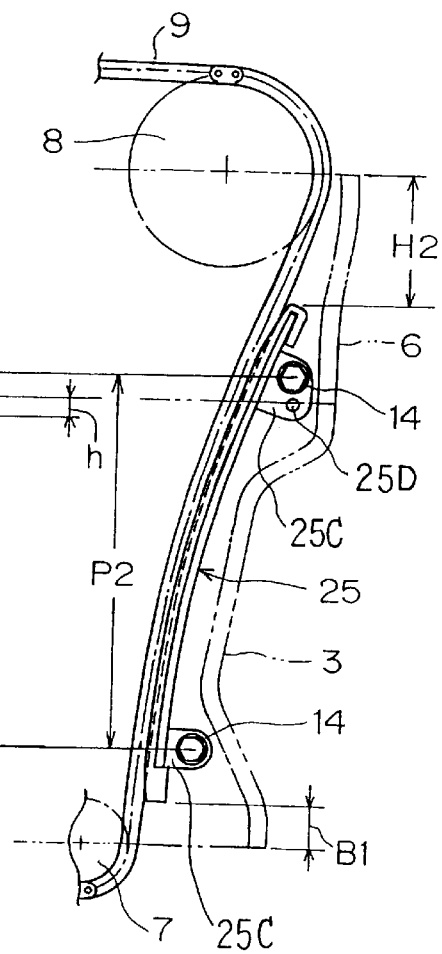
FIG. 7B is a view similar to FIG. 7A, but showing the guide mounted to an engine body having a cylinder block of a different height.

Reference is now made to FIG. 7A which shows an engine body equipped with a chain drive including the guide 25 of the fifth embodiment shown in FIG. 5. The engine body is composed of a cylinder body 1 and a cylinder head 6, and the guide 25 extends over the cylinder block 1 and cylinder head 6 and is mounted to the engine body. The chain drive also includes a tensioner device 10 comprised of a tensioner 10A and a tensioner lever 10B urged by the tensioner 10A against a slack run of a chain 9 of the chain drive. FIG. 7B shows a right half of a chain drive installed on an engine body having a cylinder block 3 which differs in height from the cylinder block 1 shown in FIG. 7A.

The chain drives shown in FIGS. 7A and 7B are substantially the same as those shown in FIGS. 8A and 8C, respectively, except the way of mounting of the guide 25 onto the engine body, as will be understood from the following description.

In the chain drive shown in FIG. 7A, the guide 25 is mounted to the engine body in such a manner that the upper mounting portion 25c is attached to the cylinder head 6 by means of a screw 14 threaded through the lower mounting hole of the two circular mounting holes 25D (upper one being shown) in the upper mounting portion 25C into a threaded hole (not shown) formed in the cylinder head 6, and the lower mounting portion 25C is attached to the cylinder body 1 by means of a screw 14 threaded through the mounting hole 25D (see FIG. 5) in the lower mounting portion 25C into the threaded hole (not shown) formed in the cylinder block 1. The threaded holes of the engine body are spaced by a distance or pitch P1.

FIG. 7B shows a right half of a chain drive installed on an engine body so modified as to change a cubic capacity or displacement of the engine by replacing the cylinder block 1 of FIG. 7A with a cylinder block 3 having a different height which is larger than the height of the cylinder block 1 by a distance of h.

As shown in FIG. 7B, the cylinder head 6 is the same as the one used in the engine body shown in FIG. 7A. When viewed from the axis of the crank sprocket 7, the threaded hole formed in the cylinder block 3 is located at the same position as the threaded hole formed in the cylinder block 1 shown in FIG. 7A so that the same processing can be used for forming threaded holes of the two different cylinder blocks 1, 3. The guide 25 is mounted to the engine body such that the upper mounting portion 25C is attached to the cylinder head 6 by means of a screw 14 threaded through the upper mounting hole of the two circular mounting holes 25D (lower one being shown) into the threaded hole in the cylinder head 6, and the lower mounting portion 25C is attached to the cylinder block 3 by means of a screw 14 threaded through the mounting hole 25D (see FIG. 5) in the lower mounting portion 25C into the threaded hole formed in the cylinder block 3. The threaded holes in the engine body is spaced by a distance or pitch P2 which is larger than the pitch P1 (FIG. 7A) by the distance h. By thus using the two circular mounting holes 25D of the lower mounting portion 25C, selectively, the guide 25 can adapt itself to two engine bodies each having a different threaded hole pitch.

As seen from FIGS. 7A and 7B, modification made to form the engine body of FIG. 7B from the engine body of FIG. 7A does not change the positional relationship between the crank sprocket 7 and the guide 25. In other words, the distance B1 between a horizontal plane containing the axis of the crank sprocket 7 and an end (lower end) of the guide 25 adjacent to the cylinder block 1 of the engine body shown in FIG. 7A is equal to the distance B1 between a horizontal plane containing the axis of the crank sprockets 7 and the lower end of the guide 25 adjacent to the cylinder block 3 of the engine body shown in FIG. 7B. This means that the chain drive shown in FIG. 7A and the chain drive shown in FIG. 7B have the same chain line or path extending between the crank sprocket 7 and the guide 25 even though the height of the cylinder block is changed. Since the same guide 25 can be used in common, this arrangement is particularly advantageous when the length of a guide should be minimized due to a small space available around the crank sprocket 7 for installation of the guide.

In the embodiments described above, the guides 21–25 are designed to be mounted to an engine body at two mounting portions thereof. The number of the mounting portions should by no means be limited to two as in the illustrated embodiments but may include three or more mounting portions.

In the embodiments shown in FIGS. 2, 3, 4 and 5, one mounting portion of the guide have two circular mounting holes. It is important to note that a guide according to the present invention has at least two circular mounting holes formed in at least one mounting portion. These circular mounting holes may be replaced with a single oblong holes having an effective length corresponding to the center distance between two endmost circular mounting holes. By thus constructing the guide, it is possible to use a single guide together with more than two engine bodies each having a different threaded-hole pitch.

In addition, the guides in the illustrated embodiment has a guide body formed from a sheet metal. The guide body may be formed by molding, forging, sintering or machining a metallic material, or molded from a synthetic resin. As a further alternative, the guide as a whole may be molded from a synthetic resin and has a shoe as an integral part of the molded guide.

Obviously, various minor changes and modifications of the present invention are possible in the light of the above teaching. It is therefore to be understood that within the scope of the appended claims, the present invention may be practiced otherwise than as specifically described.

What is claimed is:

1. A guide assembly selectively usable for both a first chain drive combined with a first engine body having two screw holes having a distance between said screw holes of a first pitch, and a second chain drive combined with a second engine body having two screw holes having a distance between said screw holes of a second pitch different from said first pitch;

said guide assembly comprising a guide having an elongated shoe surface and at least two projecting mounting portions spaced apart longitudinally of said shoe surface, and at least two screws, said guide adapted to be attached to the first or second engine body by means of said two screws passing through said at least two mounting portions respectively and adapted to be threaded into the screw holes in the engine body, at least one of said mounting portions having at least two circular mounting holes spaced apart longitudinally of said shoe surface by a distance equal to the difference between said first and second pitches, and said guide can be selectively mounted on said first engine body or said second engine body by the passing of said screw through at least one of said circular mounting holes.

2. A guide assembly selectively usable for both a first chain drive combined with a first engine body having two screw holes having a distance between said screw holes of a first pitch, and a second chain drive combined with a second engine body having two screw holes having a distance between said screw holes of a second pitch different from said first pitch;

said guide assembly comprising a guide having an elongated shoe surface and at least two projecting mounting portions spaced apart longitudinally of said shoe surface, and at least two screws, said guide adapted to be attached to the first or second engine body by means of said two screws passing through said at least two mounting portions respectively and adapted to be threaded into the screw holes in the engine body, at least one of said mounting portions having an oblong hole elongated longitudinally of said shoe surface by a length equal to the difference between said first and second pitches, and said guide can be selectively mounted on said first engine body or said second engine body by the passing of said screw through said oblong hole.

* * * * *

UNITED STATES PATENT AND TRADEMARK OFFICE
CERTIFICATE OF CORRECTION

PATENT NO. : 6,585,614 B1
DATED : July 1, 2003
INVENTOR(S) : Kumakura

It is certified that error appears in the above-identified patent and that said Letters Patent is hereby corrected as shown below:

Column 1,
Line 37, "(not show)" should be -- (not shown) --;

Column 6,
Line 17, "21E'''" should be -- 21D" --.

Signed and Sealed this

Ninth Day of December, 2003

JAMES E. ROGAN
*Director of the United States Patent and Trademark Office*